(12) United States Patent
Uchikawa

(10) Patent No.: US 8,073,257 B2
(45) Date of Patent: *Dec. 6, 2011

(54) INFORMATION PROCESSING SYSTEM, INFORMATION PROCESSING METHOD, IMAGE PROCESSING APPARATUS, PROGRAM, AND RECORDING MEDIUM

(75) Inventor: Hiroshi Uchikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,090

(22) Filed: Jun. 11, 2010

(65) Prior Publication Data

US 2010/0246962 A1 Sep. 30, 2010

Related U.S. Application Data

(63) Continuation of application No. 10/985,748, filed on Nov. 9, 2004, now Pat. No. 7,760,944.

(30) Foreign Application Priority Data

Nov. 21, 2003 (JP) ................................ 2003-392728

(51) Int. Cl.
*G06K 9/00* (2006.01)
(52) U.S. Cl. ........ 382/181; 382/173; 382/304; 348/474; 348/501

(58) Field of Classification Search .................. 382/181, 382/474, 501, 538; 358/448, 462
See application file for complete search history.

(56) References Cited

U.S. PATENT DOCUMENTS

| | | | |
|---|---|---|---|
| 5,557,430 A * | 9/1996 | Isemura et al. | 358/501 |
| 5,917,619 A * | 6/1999 | Yamagata et al. | 358/501 |
| 6,018,749 A * | 1/2000 | Rivette et al. | 715/202 |
| 6,360,011 B1 * | 3/2002 | Katsumata et al. | 382/181 |
| 6,567,797 B1 * | 5/2003 | Schuetze et al. | 1/1 |
| 6,822,759 B1 * | 11/2004 | Konishi et al. | 358/1.9 |
| 6,917,438 B1 * | 7/2005 | Yoda et al. | 358/1.15 |
| 7,057,753 B1 * | 6/2006 | Kajita et al. | 358/1.15 |
| 7,081,975 B2 * | 7/2006 | Yoda et al. | 358/474 |
| 7,254,283 B1 * | 8/2007 | Nishigaki et al. | 382/304 |
| 2003/0086127 A1 * | 5/2003 | Ito et al. | 358/462 |
| 2004/0066969 A1 * | 4/2004 | Aihara | 382/173 |
| 2005/0024679 A1 * | 2/2005 | Yoda et al. | 358/1.15 |
| 2007/0280539 A1 * | 12/2007 | Hasegawa et al. | 382/195 |

FOREIGN PATENT DOCUMENTS

| | | |
|---|---|---|
| JP | 09-093384 A | 4/1997 |
| JP | 11-120323 A | 4/1999 |

* cited by examiner

*Primary Examiner* — Wesley Tucker
*Assistant Examiner* — Aklilu Woldemariam

(57) ABSTRACT

Text data is extracted from image data read by an image reader. Log data containing the extracted text data is generated. The generated log data is stored in a log management server.

14 Claims, 9 Drawing Sheets

FIG. 5

May 17 21:32:46 192.168.0.1 ImageAudi td: scan uchikawa http://192.168.0.2/storage/238473.img
COURSE APPLICATION FORM Java INTERMEDIATE COURSE ADDRESS ...

May 17 21:31:01 192.168.0.11 ImageAudi td: copy hikieu http://192.168.0.2/storage/238474.img
TECHNICAL REPORT CREATION DATE MAY 17, 2003 ...

May 17 21:35:01 192.168.0.29 ImageAudi td: fax unknown http://192.168.0.2/storage/238475.img
REQUEST FOR ESTIMATION PERSONAL COMPUTERS 3 UNITS ...

May 17 21:46:34 192.168.0.22 ImageAudi td: fax unknown http://192.168.0.2/storage/238476.img
REQUEST FOR ESTIMATION PERSONAL COMPUTERS 3 UNITS ...

May 17 21:59:48 192.168.0.11 ImageAudi td: scan kanazawa ftp://host.co.jp/development2003.doc [confidential]
DEVELOPMENT PLAN DEVELOPMENT CODE 123 ...

.
.
.

May 18 08:33:51 192.168.0.1 ImageAudi td: copy yamamoto http://192.168.0.2/storage/238484.img
TECHNICAL REPORT CREATION DATE MAY 18, 2003 ...

May 18 08:93:32 192.168.0.1 ImageAudi td: copy uchikawa http://192.168.0.2/storage/238495.img
COURSE APPLICATION FORM C--INTERMEDIATE COURSE ADDRESS ...

FIG. 6

| 6001 | 6002 | 6003 | 6004 | 6005 | 6006 | 6007 |
|---|---|---|---|---|---|---|
| DATE AND TIME | DEVICE ADDRESS | PROGRAM NAME | JOB TYPE | USER NAME | IMAGE DATA STORAGE URI | TEXT DATA |
| May 17 21:52:49 | 192.168.0.1 | imageAuditd | scan | uchikawa | file://192.168.0.2/storage/238473.img | COURSE APPLICATION FORM Java INTERMEDIATE COURSE ADDRESS ... |

INFORMATION PROCESSING SYSTEM, INFORMATION PROCESSING METHOD, IMAGE PROCESSING APPARATUS, PROGRAM, AND RECORDING MEDIUM

CROSS REFERENCE OF RELATED APPLICATIONS

This application is a Continuation of U.S. patent application Ser. No. 10/985,748 filed Nov. 9, 2004 which claims priority from Japanese Patent Application No. 2003-392782 filed Nov. 21, 2003, both of which are hereby incorporated by reference herein.

BACKGROUND OF THE INVENTION

1. Field of the Invention

The present invention relates to an information processing system and image processing apparatus for efficiently managing read image data, an information processing method for use therewith, a program thereof, and a recording medium thereof.

2. Description of the Related Art

As image processing apparatuses have become popular, it has become possible for anybody to easily copy and transmit documents. However, although the convenience has improved for a user, significant problems regarding information leakage from copying and transmitting secret documents have occurred. As countermeasures against such problems, there is an image processing apparatus for storing all the read image data in a recording device during copying and transmission. As a result, a manager can trace a leaked document by checking the image data in the image processing apparatus that read the information of the leaked document with regard to when, where, and how the document was processed.

Additionally, there is an image processing apparatus including means, in which image patterns of paper money, valuable securities, and the like are recorded in advance for the purpose of preventing counterfeit thereof, for performing processing on an output image so as to verify that it is a copy when the features of the read image data are extracted and it is determined to be a copy prohibited document, for stopping a copying operation, and for issuing a notification (see, for example, Japanese Patent Laid-Open No. 6-270477).

However, in the conventional image processing apparatus, since all of the read image data is stored in a recording device, when information leakage occurs, the manager needs to check the image data sequentially to trace when, where, and how it was processed, and a significant amount of time is required.

In the image processing apparatus for extracting the features of the read image data and determining whether it is a copy prohibited document, since patterns of copy prohibited documents must be stored in advance in the image processing apparatus, types of documents desired to be monitored are limited, and the documents cannot be changed easily.

Against such a background, there has been a demand for an image processing apparatus that is capable of easily examining read image data under various monitoring conditions.

SUMMARY OF THE INVENTION

Accordingly, the present invention provides an information processing system capable of easily monitoring when, where, and how read image data was processed, an information processing method for use therewith, a program therefor, and a recording medium therefor.

The present invention generates log data for reading a document including first text data extracted from first image data read by an image reader.

The present invention provides a second storing controller causing to store the first image data into a second storing unit, and to generate the log data including location information indicating a location of storing the first image data in the second storing unit. In a case of detecting location information, second image data corresponding to the document based on the image data read by the first image reader, the log data generated includes the location information of the second image data without storing the first image data into the second storing unit.

Log data including second text data is generated instead of the first text data if the size (amount) of the first text data is not greater than a predetermined threshold value.

In accordance with an aspect of the present invention, an information processing system includes: an extractor for extracting first text data from first image data obtained by reading a document with an image reader; a log data generator for generating log data that shows a log related to a process for reading the document by the image reader and that contains the first text data extracted by the extractor; and a first storing controller for storing the log data generated by the log data generator in a first storage unit.

In accordance with another aspect of the present invention, an information processing method for use with an information processing apparatus includes: extracting text data from image data read by an image reader; generating log data that shows a log related to a process for reading the image data by the image reader and that contains the text data that was extracted; and storing the log data that was generated in a storage device.

In accordance with another aspect of the present invention, an image processing apparatus includes: an image reader for reading a document and generating first image data; an extractor for extracting first text data from the first image data; a log data generator for generating log data that shows a log related to a process for reading the document data by the image reader and that contains the first text data extracted by the extractor; and a transmitter for transmitting the log data generated by the log data generator to a first external server.

Further features and advantages of the present invention will become apparent from the following description of the preferred embodiments with reference to the attached drawings.

BRIEF DESCRIPTION OF THE DRAWINGS

FIG. 5 shows an example of a log file recorded in the log management server in the first and second embodiments of the present invention.

FIG. 6 shows the meanings of entries of log data recorded in the log management server in the first and second embodiments of the present invention.

FIGS. 7-1 to 7-2 is a flowchart showing the operation of the copier according to the second embodiment of the present invention.

DESCRIPTION OF THE EMBODIMENTS

Exemplary embodiments of the present invention are described below in detail with reference to the attached drawings.

First Embodiment

A first embodiment of the present invention is described first.

Figure 1:
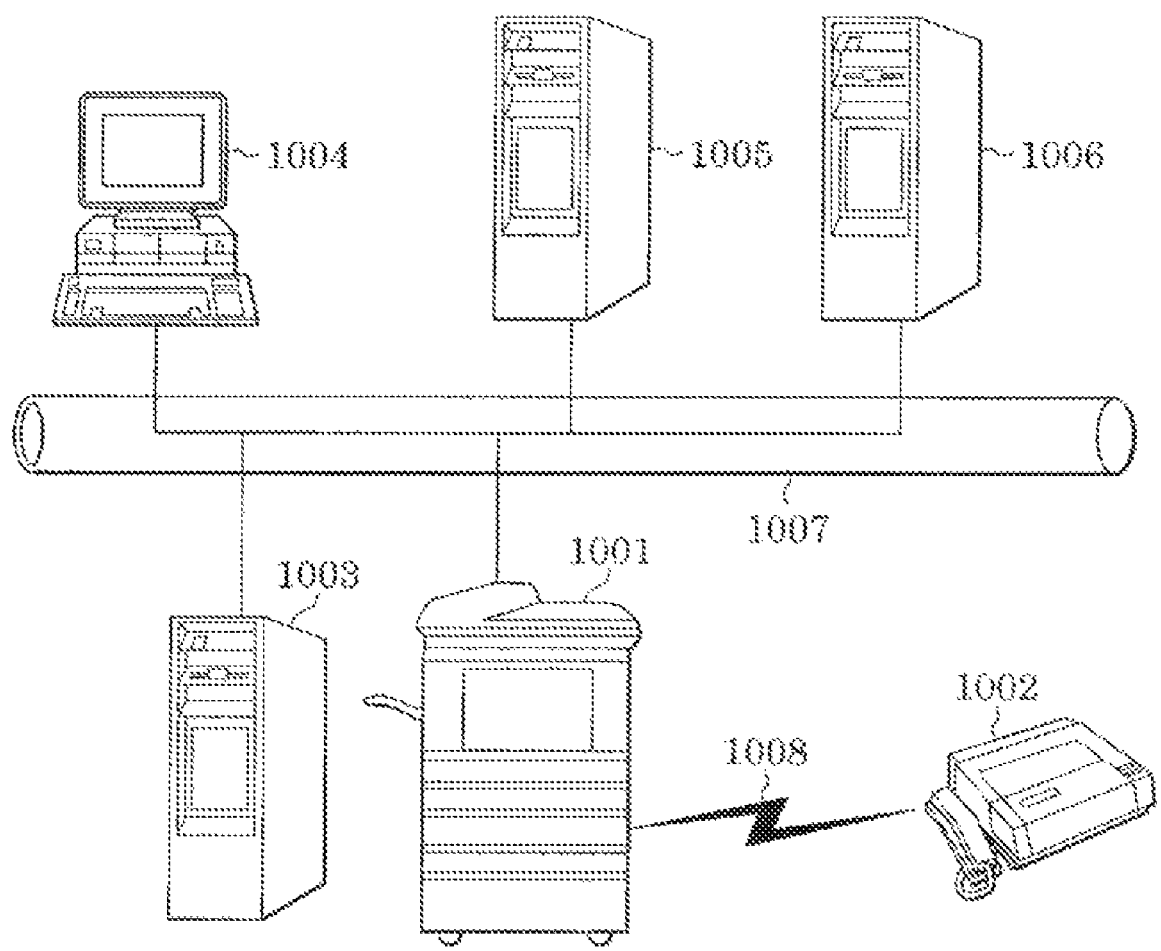
FIG. 1 shows the basic system configuration according to first and second embodiments of the present invention.

FIG. 1 shows the basic system configuration according to the first embodiment of the present invention.

A copier 1001 is a device for reading a document, copying it, and transmitting it to various devices. A facsimile 1002 receives the data read by the copier 1001 via a public switched network 1008, and prints the data. A database/mail server 1003 is a computer in which an application for storing data read by the copier 1001 operates.

A client computer 1004 is connected to the database/mail server 1003, and downloads and displays the stored data. A storage server 1005 is an audit storage device for storing all the image data read by the copier 1001. A log management server 1006 records the log of copying and transmission jobs in the copier 1001. An Ethernet 1007 is a network for interconnecting the copier 1001, the database/mail server 1003, the client computer 1004, the storage server 1005, and the log management server 1006.

Figure 2:
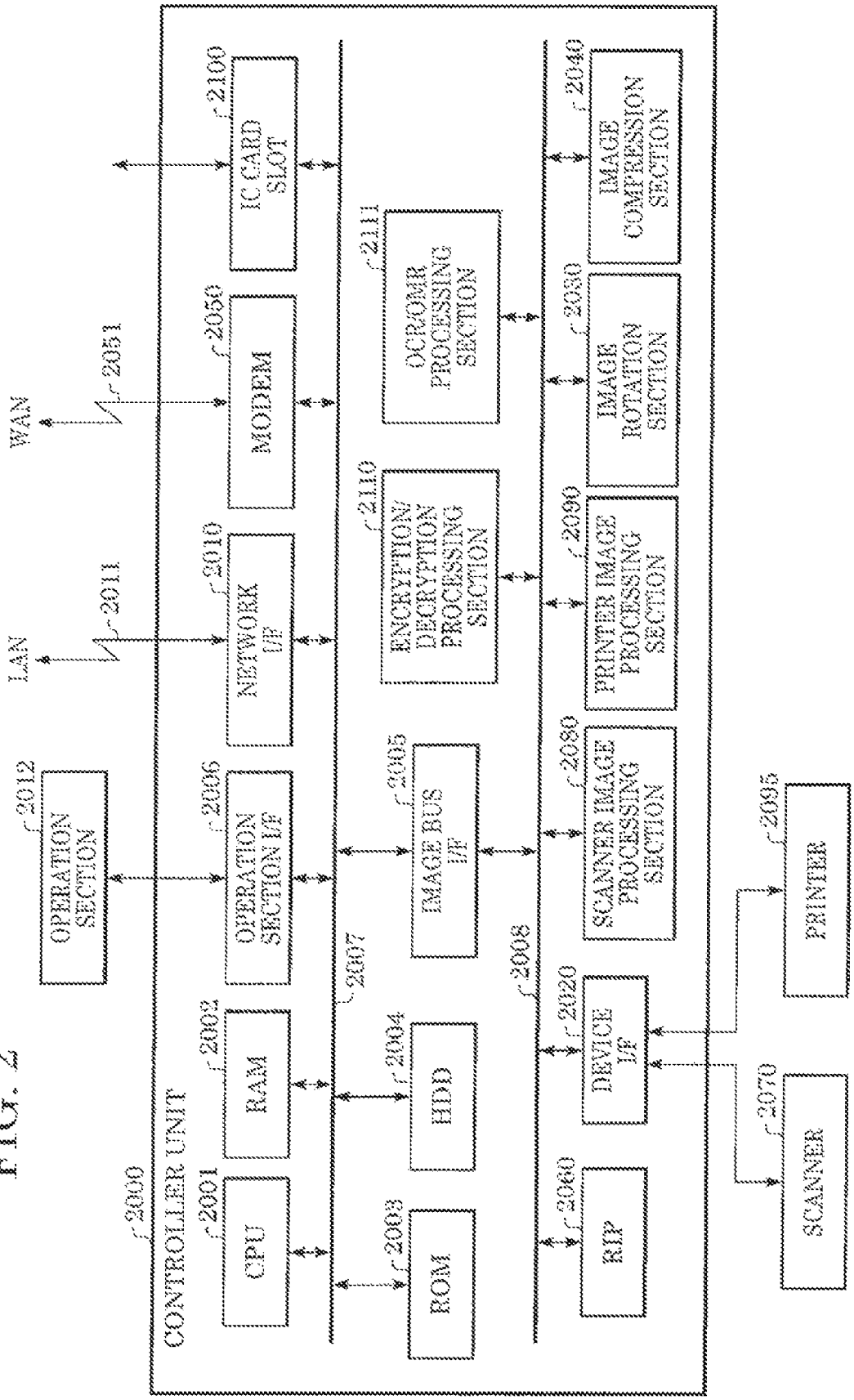
FIG. 2 shows the system configuration of a copier according to the first and second embodiments of the present invention.

FIG. 2 is a block diagram showing the system configuration of the copier 1001 in this embodiment. A controller unit 2000 is a controller that is connected to a scanner 2070, which is an image input device, and a printer 2095, which is an image output device. The controller unit 2000 is also connected to a LAN 2011 and a public switched network (WAN) 2051 so that image information and device information are input and output. A CPU (Central Processing Unit) 2001 is a controller for centrally controlling the system. A RAM (Random-Access Memory) 2002 is a system work memory for the CPU 2001 to operate, and is also an image memory for temporarily storing image data.

A ROM (Read-Only Memory) 2003 is a boot ROM in which the boot program for the system is stored. An HDD 2004 is a hard disk drive for storing system software and image data. An operation section interface 2006 is an interface section with an operation section (UI) 2012 having a touch panel, and outputs, to the operation section 2012, the image data to be displayed in the operation section 2012. The operation section interface 2006 also serves to transmit, to the CPU 2001, the information input from the operation section 2012 input by a user of this system.

A network interface 2010, which is connected to the LAN 2011, inputs and outputs information. A modem 2050, which is connected to the public switched network (WAN) 2051, inputs and outputs information. The above-described devices are connected to a system bus 2007. An image bus interface 2005 is a bus bridge, through which the system bus 2007 is connected to an image bus 2008 for transferring image data at a high speed, the bus bridge converting the data structure. The image bus 2008 is formed by a PCI bus or an IEEE 1394 bus. Devices connected to the image bus 2008 are described below.

A raster image processor (RIP) 2060 converts PDL (Page Description Language) code into a bit-map image. A device interface section 2020 connects the scanner 2070 and the printer 2095, which are image input/output devices, to the controller unit 2000, and performs synchronous/asynchronous conversion of image data. A scanner image processing section 2080 corrects, processes, and edits the input image data. A printer image processing section 2090 performs a correction of the printer, a resolution conversion thereof, etc., on the print output image data.

An image rotation section 2030 rotates image data. An image compression section 2040 performs a compression/decompression process of JPEG on multi-valued image data and a compression/decompression process of JBIG (Joint Bi-level Image Experts Group), MMR (Modified Modified READ), and MH (Modified Huffman) on binary image data. In an IC card slot 2100, by inputting an appropriate PIN (Personal Identifier Number) code after an IC card medium is inserted, it becomes possible to input or output a key used for encryption and decryption.

An encryption/decryption processing section 2110 is a hardware accelerator board for performing a data encryption/decryption process by using the key of the IC card slot 2100. An OCR/OMR (optical character recognition/optical mark recognition) processing section 2111 performs a process for decrypting character information and two-dimensional bar codes contained in the image data and converting them into character codes.

Figure 3:
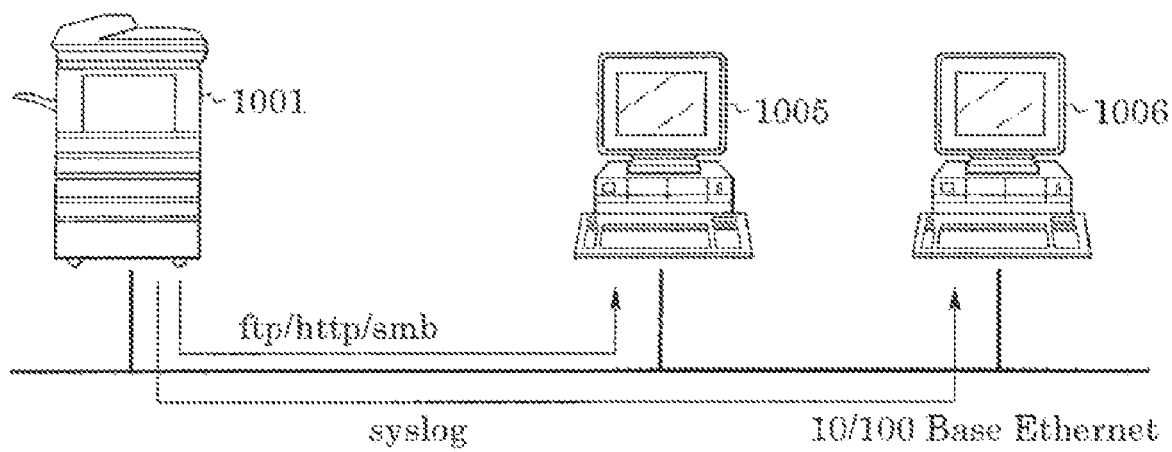
FIG. 3 shows an example of the configuration in which the copier writes image data to a storage server and log data to a log management server.

FIG. 3 shows an example of the configuration in which the copier 1001 writes image data to the storage server 1005 and writes log data to the log management server 1006.

In the configuration shown in FIG. 3, the Ethernet is used, and when image data is stored from the copier 1001 into the storage server 1005, protocols of HTTP (Hyper Text Transfer Protocol), FTP (File Transfer Protocol), and SMB (Server Message Block) are used. However, any existing protocol may be used as long as it is a protocol capable of transferring data, and an encryption process may be performed as needed.

For writing log data from the copier 1001 to the log management server 1006, syslog is used. However, another existing logging protocol may be used. In this embodiment, the copier 1001, the storage server 1005, and the log management server 1006 are formed as individual entities, but any or all of them may be combined. The setting information required to access the storage server 1005 and the log management server 1006 is protected so that only the system administrator of the copier 1001 can set it.

Figure 4:
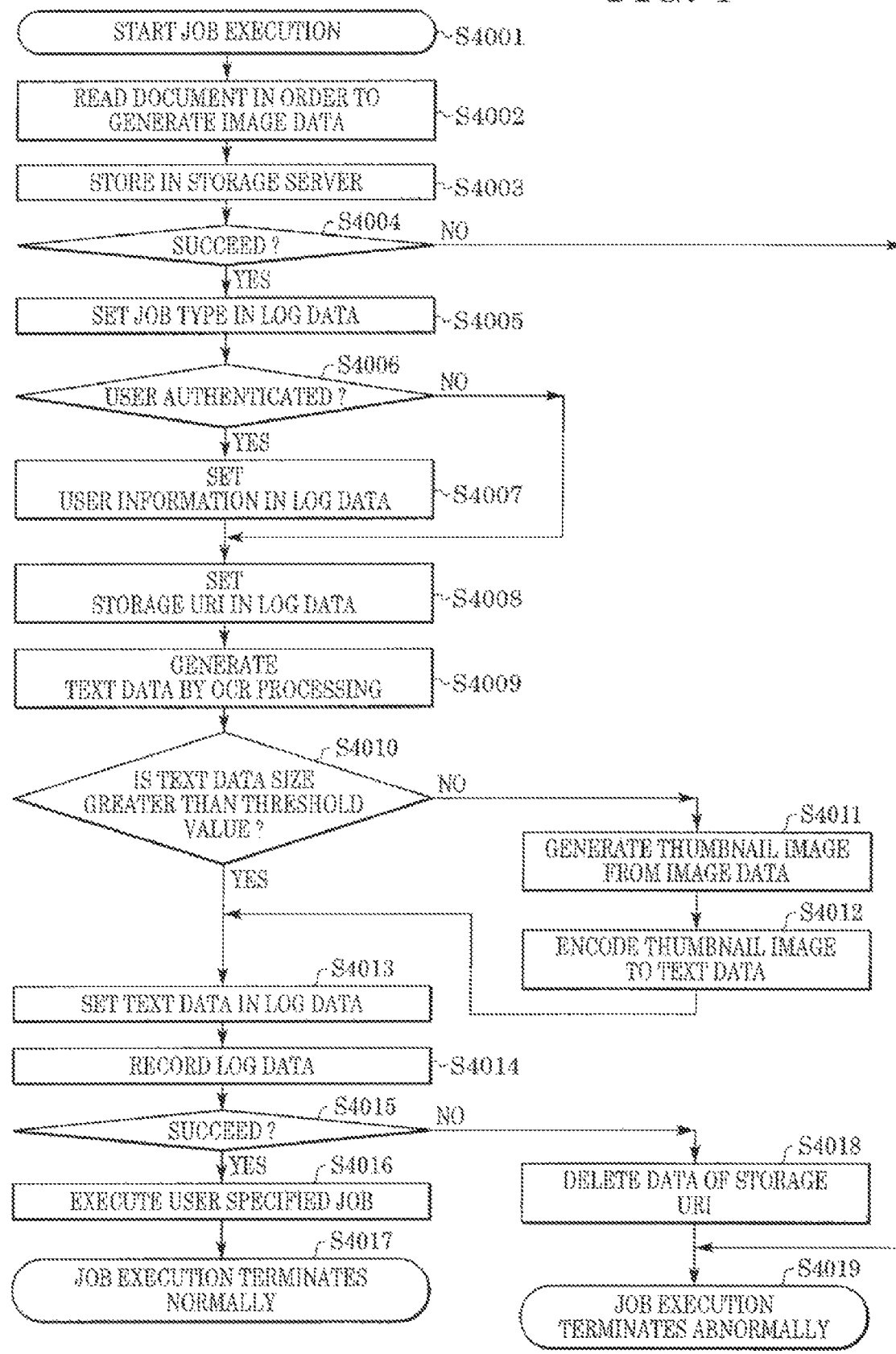
FIG. 4 is a flowchart showing the operation of the copier according to the first embodiment of the present invention.

FIG. 4 is a flowchart showing processing in which all the read image data is stored in a specified storage device and recording, the URI (Uniform Resource Identifier) and text data contained in the image data are recorded in log data.

In step S4001, the user places a document in an automatic document feeding device or a document holder of the scanner 2070, and performs the setting of the number of copies and the transmission destination in accordance with a desired purpose such as copying and transmission. Thereafter, the user instructs the starting of job execution. Next, in step S4002, the document is read using the scanner 2070, and the generated image data is sequentially recorded for each page in the HDD 2004. After the reading is completed up to the final page, the process proceeds to step S4003, where the image data recorded in the HDD 2004 is stored in the specified storage server 1005.

The storage into the storage server 1005 may be performed in such a manner that a plurality of pages are stored individually, or after a plurality of pages are bound into one document, this is stored. After the process of storage into the storage server 1005 is completed, in step S4004, the result of the storing process is verified. If the storage process did not succeed, the process proceeds to step S4019, where the fact that an abnormal state has occurred is displayed in the operation section 2012, and the job execution terminates abnormally.

On the other hand, if the storage process succeeded, the process proceeds to step S4005, where the job type of execution job is set in the log data. The job type in this embodiment indicates a function type, such as copy, facsimile, and scan. Next, in step S4006, it is determined whether or not the copier 1001 is set as in such a manner that the user is authenticated. When it is determined that the user is authenticated, the process proceeds to step S4007, where user information, for example, the user name and the user ID, is set in the log data. The process then proceeds to step S4008.

On the other hand, if it is determined that the user is not authenticated, the process directly proceeds to step S4008. In step S4008, the URI of the image data stored in the storage server 1005 in step S4003 is set in the log data. In step S4009, by using the OCR/OMR processing section 2111, text data is extracted from the image data recorded in the HDD 2004 in step S4009.

Next, in step S4010, it is determined whether or not the size of the extracted text data is greater than a threshold value. When it is determined that the size of the extracted text data is less than or equal to the predetermined threshold value, for example, the size is only several bytes, the process proceeds to step S4011, where the thumbnail image data of the image data is generated. In the subsequent step S4012, the generated thumbnail image data is encoded to text data, and the process then proceeds to step S4013. On the other hand, when it is determined in step S4010 that the size of the text data is greater than the predetermined threshold value, the process directly proceeds to step S4013. In step S4013, the text data generated in step S4009 or S4012 is set in the log data. In step S4014, the log data is written into the predetermined log management server 1006.

In this embodiment, when it is determined in step S4010 that the size of the extracted text data is less than or equal to the predetermined threshold value, the text data obtained by encoding the thumbnail image data of the image data is set in the log data, so that a search can be performed for the desired log data from the text data. As another example of the configuration, the text data is not generated from the thumbnail image data, and the thumbnail image data itself may be stored in the storage server 1005 in such a manner as to be associated with the storage URI of the log data in the log management server 1006. This makes it possible to make a display of a list of thumbnail images in the client computer 1004 so that a search can be performed for desired log data by selecting the thumbnail image. In this case, the text data extracted in step S4009 is not set in the log data.

After the recording process in the log management server 1006 is completed, in step S4015, the result of the recording process is verified. When it succeeded, the process proceeds to step S4016, where the job specified by the user in step S4001 is executed. Then, in step S4017, the job execution terminates normally. If it did not succeed, the process proceeds to step S4018, where the image data stored in step S4003 is deleted. In the subsequent step S4019, the fact that an abnormal state has occurred is displayed in the operation section 2012, and the job execution terminates abnormally.

FIG. 5 shows an example of a log file recorded in the log management server 1006 in this embodiment.

In the log management server 1006, in accordance with the flowchart of FIG. 4, a log writing instruction is received from the copier 1001 in units of jobs, and the log data of one record is generated in units of jobs. A log file made up of such log data is stored for a fixed period of time in the log management server 1006 so that it can be used for an audit.

FIG. 6 shows the meanings of entries of log data recorded in the log management server 1006 in this embodiment.

Date and time 6001 indicates date and time when the log writing occurred. A device address 6002 is an IP address or a host name of a device that executed a job. A program name 6003 is the name of a program that wrote a log. A job type 6004 indicates a function type, such as copy, facsimile, or scan. A user name 6005 indicates a user name composed of a character string that identifies the user who executed the job, or a user ID composed of a numerical value. An image data storage URI 6006 is the URI at which the read image data is stored or the URI of the original data of the document. By accessing this URI, it becomes possible to access the image data of the read document. Text data 6007 is text data extracted by performing an OCR/OMR process on the read image data.

As described above, according to the first embodiment of the present invention, it is possible to record the URI of the read image data and the text data contained in the image data as the log data of the log management server. As a result, it becomes possible to search for the log data containing the text code indicating the content of the read image data by using a character string. Thus, it is possible to easily realize monitoring of when, where, and how the read document was processed under various monitoring conditions.

Furthermore, according to the first embodiment of the present invention, as a result of providing a method for authentication for identifying and confirming the user during operation, it is possible to specify the user who has executed the job. As a result of providing a method for collectively recording the URI at which the user information and the image data are stored and the text data as one log data in the log management server in accordance with a predetermined protocol, it becomes possible to check as to who has performed the operation.

Second Embodiment

A second embodiment of the present invention is described next.

The basic system configuration of the second embodiment is identical to those of the first embodiment shown in FIGS. 1, 2, and 3. Accordingly, details thereof are omitted.

Figures 1, 7:
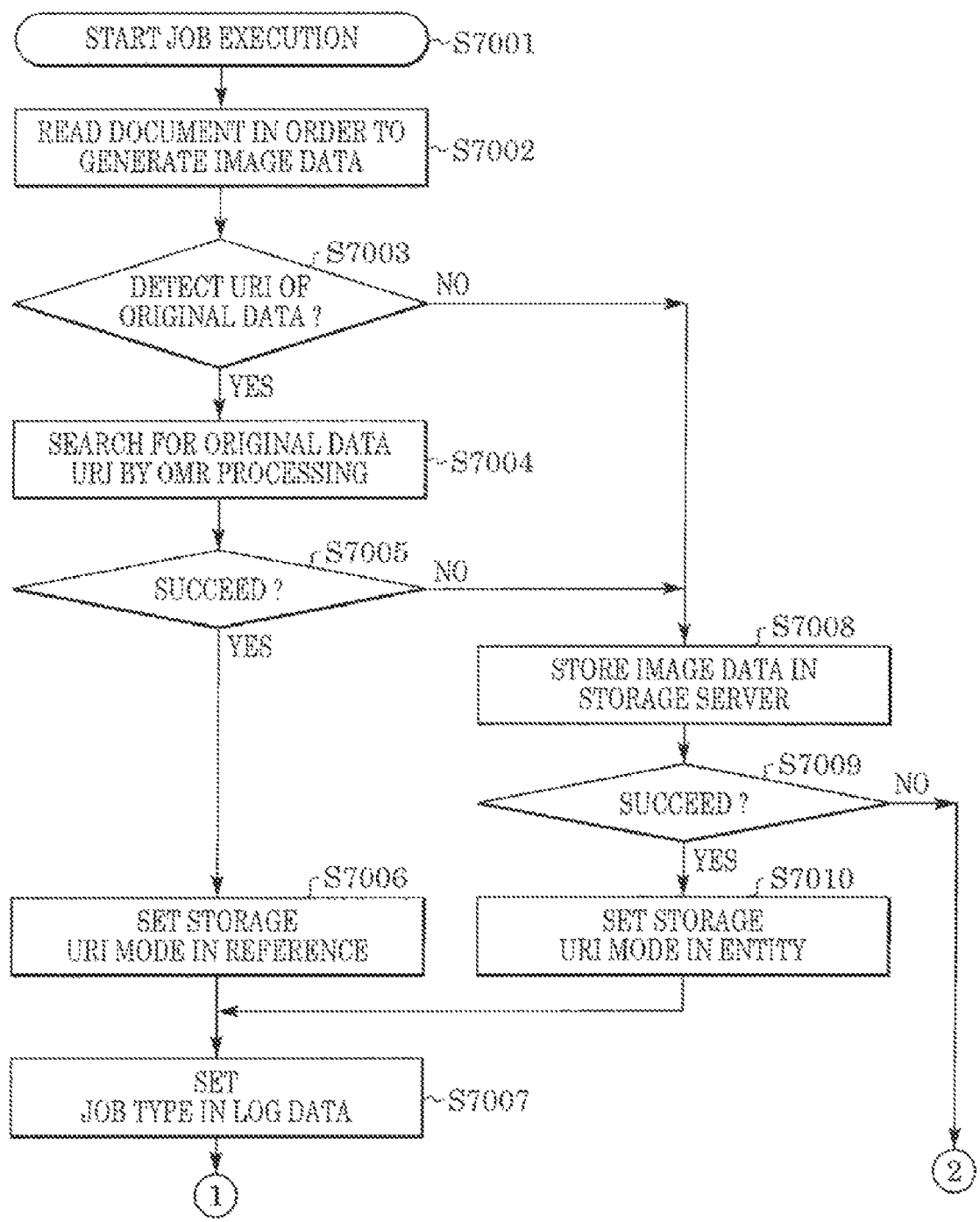
Figures 2, 7:
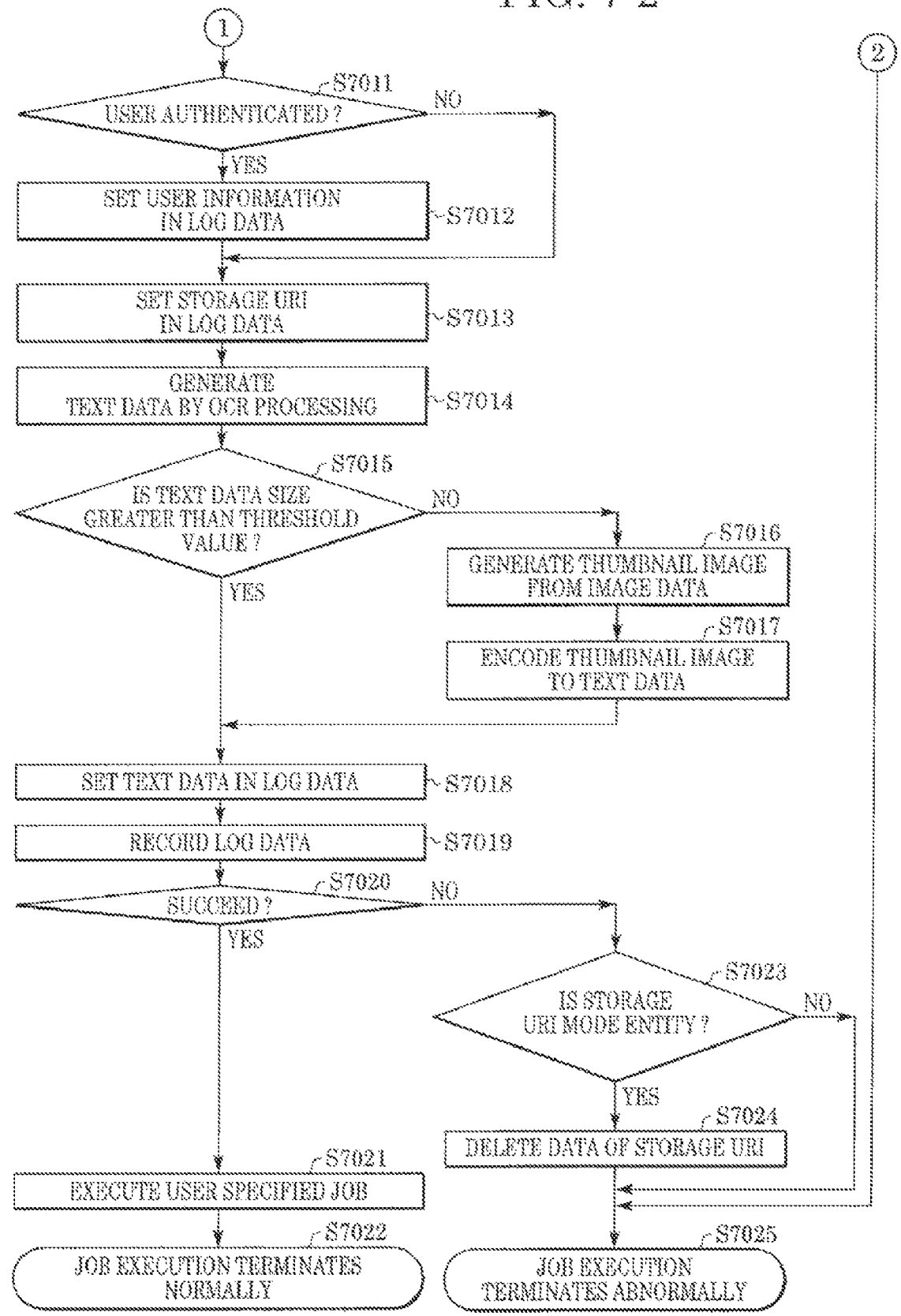

FIGS. 7-1 and 7-2 are a flowchart showing processing in this embodiment. In this embodiment, when the URI of the original data (the same data as the above-described image data) can be detected from the read image data, storage into the storage server 1005 is not performed, and the URI and the text data contained in the image data are recorded in the log data; when the URI of the original data cannot be detected, all the read image data is stored in the specified storage server 1005, and the URI and the text data contained in the image data are recorded in the log data.

In step S7001, the user places a document in an automatic document feeding device or a document holder of the scanner 2070, and performs setting of the number of copies and the transmission destination in accordance with a desired purpose such as copying and transmission. Thereafter, the user instructs the starting of job execution. Next, in step S7002, the document is read using the scanner 2070, and the generated image data is sequentially recorded for each page in the HDD 2004. After the reading is completed up to the final page, the process proceeds to step S7003, where it is determined whether or not the URI of the original data of the read document should be detected.

When the URI of the original data should be detected, the process proceeds to step S7004, where the URI of the original data is searched for by using the OCR/OMR processing section 2111. In step S7005, it is determined whether or not the URI searching process for the original data has succeeded. When it has succeeded, the process proceeds to step S7006, where the storage URI mode is set as a "reference". The process then proceeds to step S7007.

On the other hand, when it is determined in step S7003 that the URI of the original data should not be detected or when it is determined in step S7005 that the URI searching process for the original data did not succeed, the process proceeds to step S7008, where the image data recorded in the HDD 2004 is stored in the specified storage server 1005. The storage into the storage server 1005 may be performed in such a manner that a plurality of pages are stored individually, or after a plurality of pages are bound into one document, the bound document is stored.

After the storing process in the storage server 1005 is completed, in step S7009, the result of the storing process is verified. If the result is not a success, the process proceeds to step S7025, where the fact that an abnormal state has occurred is displayed in the operation section 2012, and the job execution terminates abnormally. On the other hand, if the result is a success, the process proceeds to step S7010, where the storage URI mode is set as an "entity" and the process proceeds to step S7007.

In step S7007, the job type of the job execution is set in the log data. The job type in this embodiment indicates a function type, such as copy, facsimile, and scan. Next, in step S7011, it is determined whether or not the copier 1001 is set in such a manner that the user is authenticated. When it is determined that the user is authenticated, the process proceeds to step S7012, where user information, such as the user name and the user ID, is set in the log data. The process then proceeds to step S7013.

On the other hand, if it is determined that the user is not authenticated, the process directly proceeds to step S7013. In step S7013, if the storage URI mode is a reference, the URI of the original data detected in step S7004 is set in the log data; and if the storage URI mode is an entity, the URI of the image data stored in the storage server 1005 in step S7008 is set in the log data. In step S7014, by using the OCR/OMR processing section 2111, text data is extracted from the image data recorded in the HDD 2004 in step S7014.

Next, in step S7015, it is determined whether or not the size of the extracted text data is greater than a threshold value. When it is determined that the size of the extracted text data is less than or equal to the predetermined threshold value, for example, the size is only several bytes, the process proceeds to step S7016, where the thumbnail image data of the image data is generated. In the subsequent step S7017, the generated thumbnail image data is encoded to text data, and the process then proceeds to step S7018. On the other hand, when it is determined in step S7015 that the size of the text data is greater than the predetermined threshold value, the process directly proceeds to step S7018. In step S7018, the text data generated in step S7014 or S7017 is set in the log data. In step S7019, the log data is written into the predetermined log management server 1006.

In this embodiment, when it is determined in step S7015 that the size of the extracted text data is less than or equal to the predetermined threshold value, the text data obtained by encoding the thumbnail image data of the image data is set in the log data, so that desired log data can be searched for from the text data. As another example of the configuration, the text data is not generated from the thumbnail image data, and the thumbnail image data itself may be stored in the storage server 1005 in such a manner as to be associated with the storage location of the corresponding log data in the corresponding log management server 1006. This makes it possible to make a display of a list of thumbnail images in the client computer 1004 so that desired log data can be searched for by selecting the thumbnail image. In this case, the text data extracted in step S7014 is not set in the log data.

After the recording process in the log management server 1006 is completed, in step S7020, the result of the recording process is verified. When the result is a success, the process proceeds to step S7021, where the job specified in step S7001 by the user is executed. Then, in step S7022, the job execution terminates normally. On the other hand, if the result is not a success, the process proceeds to step S7023, where it is determined whether the storage URI mode is an entity or a reference. When it is determined that the storage URI mode is an entity, the process proceeds to step S7024, where the data of the storage URI, that is, the image data stored in step S7008, is deleted, and the process then proceeds to step S7025. When it is determined that the storage URI mode is not an entity, the process directly proceeds to step S7025, where the fact that an abnormal state has occurred is displayed in the operation section 2012, and the job execution terminates abnormally.

The example of the log file recorded in the log management server 1006 of this embodiment, and the meanings of the entries recorded in the log management server 1006 are identical to those of the example shown in FIGS. 5 and 6. Accordingly, details thereof are omitted.

Figure 8:
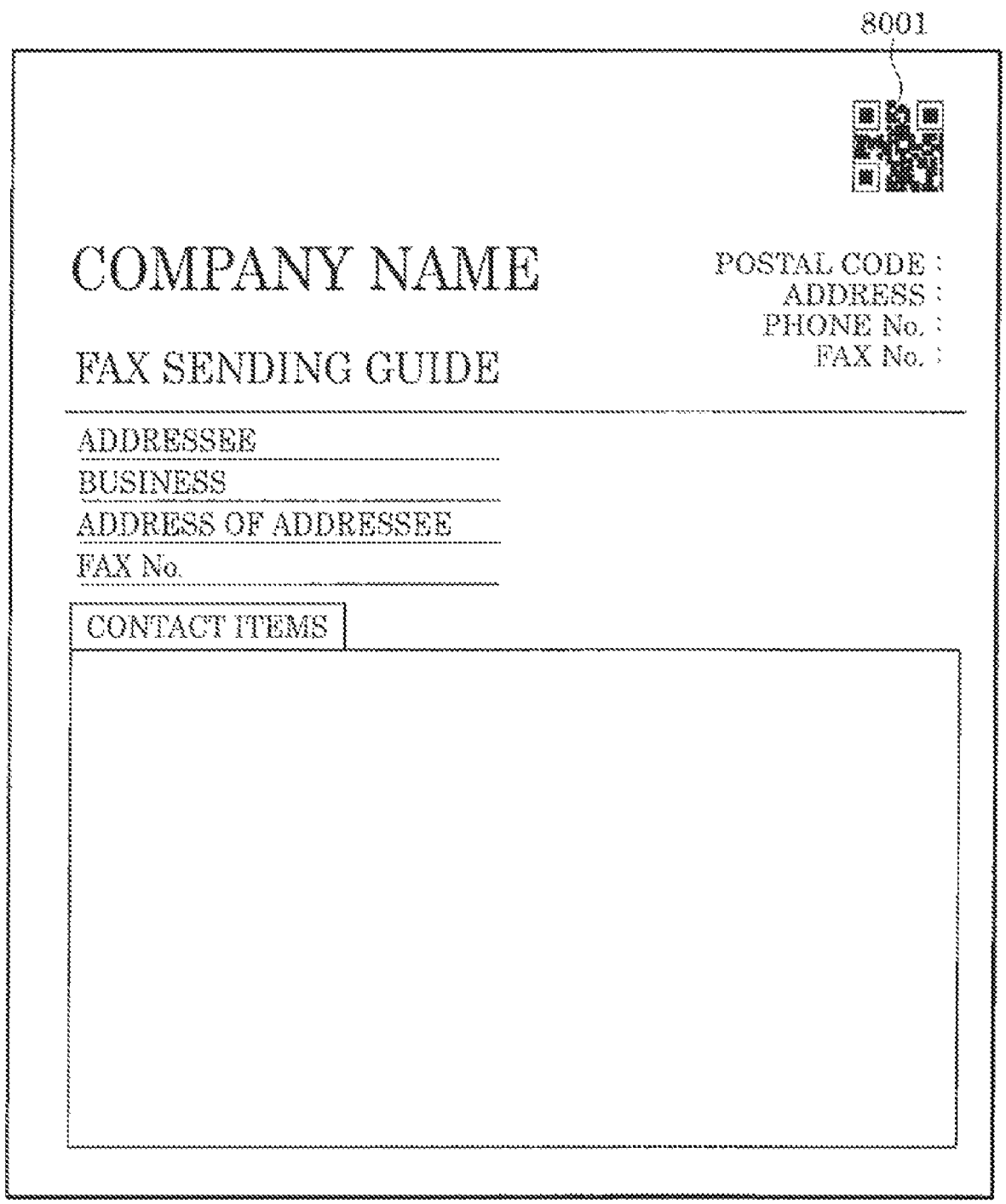
FIG. 8 shows an example of a document in which the URI of the original data can be detected from read image data in the second embodiment of the present invention.

FIG. 8 shows an example of a document in which the URI of the original data can be detected from read image data in this embodiment.

In the upper right portion of this document, a two-dimensional bar code 8001 (QR code symbol) is recorded. In this embodiment, information (URI) indicating the location of electronic data of a paper document is recorded in the two-dimensional bar code 8001. After the two-dimensional bar code 8001 is processed, by accessing the recorded URI, it is possible to confirm the original data.

In this embodiment, it is possible to further provide a method for the system administrator to selectively activate or deactivate a detecting unit of the URI of the original data. As a result, even in the case of a document in which the URI of the original data can be detected, it becomes possible to perform management so that the read image data is always stored in a specified storage device in accordance with the management policy.

As described above, according to the second embodiment of the present invention, the process for storing the read image data in a specified storage device can be omitted, and the URI of the original data as an alternative of the URI of the read image data and the text data contained in the image data can be recorded as the log data of the log management server.

Furthermore, according to the second embodiment of the present invention, when the URI of the original data cannot be detected from the read image data, as a result of providing a mechanism for storing all of the read image data in a specified storage device and for recording, as one log data, the URI at which the image data is stored and the text data in the log management server in accordance with a predetermined protocol, it becomes possible to record the URI of the read image data and the text data contained in the image data as the log data of the log management server.

Furthermore, according to the second embodiment of the present invention, as a result of providing an authentication mechanism for identifying and confirming the user during operation, it is possible to specify the user that has performed the job. As a result of providing a mechanism for collectively recording, as one log data, the user information, the URI at which the image data is stored, and the text data in the log management server in accordance with a predetermined protocol, it is possible to check who has performed the operation.

A storage medium on which program code (software) which realizes the functions of the above-described embodiments may be supplied to a system or an apparatus, and the computer (or the CPU or the MPU) of the system or the apparatus reads the program code stored on the storage medium, and executes it.

For the storage medium for supplying the program code, for example, a flexible disk, a hard disk, an optical disk, a magneto-optical disk, a compact disk-read-only memory (CD-ROM), a compact disk-recordable (CD-R), a magnetic tape, a non-volatile memory card, a ROM, etc., can be used.

Furthermore, beside the above-described functions of the above-described embodiments are realized by executing the program code which is read by the computer, the present invention includes a case where the OS (Basic System or Operating System) running on the computer performs part or the entirety of actual processing in accordance with instructions of the program code, thereby realizing the functions of the above-described embodiments.

Furthermore, the present invention also includes a case where, after the program code read from the storage medium is written into a memory provided in a function expansion board which is inserted into the computer or in a function expansion unit which is connected to the computer, the CPU or the like provided in the function expansion board or the function expansion unit performs part or the entirety of actual processing in accordance with instructions of the program code, thereby realizing the functions of the above-described embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing system comprising:
    an input unit for inputting image data on which an image processing job for causing execution of an image output process is to be performed;
    a verification data generator for generating verification data based on the image data;
    a log data generator for generating log data to be associated with the verification data;
    a storing controller for storing, in at least one storage unit, the verification data and the log data to be associated with the verification data;
    a verifying unit for determining a verification result based on whether the storing controller has stored the verification data in the at least one storage unit, wherein the verification result is positive if the verification data is stored in the at least one storage unit and the verification result is negative if the verification data is not stored in the at least one storage unit; and
    a controller for causing execution of the image output process based on the image data in response to the verification result being positive, and for causing execution of the image processing job to be terminated without causing execution of the image output process based on the image data in response to the verification result being negative.

2. The information processing system according to to claim 1, further comprising
    an image storing controller for storing the image data in an image storing unit,
    wherein the log data generated by the log data generator includes storage location information identifying a storage location of the image stored in the image stored unit.

3. The information processing system according to claim 1, wherein the log data comprises identification information of a user that operated a process for reading the image data.

4. The information processing system according to claim 1, wherein the log data comprises time information indicating when the image processing job with regard to the image data was performed.

5. The information processing system according to claim 1, wherein the log data comprises identification information of a device which performs the image processing job.

6. The information processing system according to claim 1, wherein the log data comprises identification information of the image processing job performed with regard to the image data.

7. An information processing method for use with an information processing apparatus, the information processing method comprising:
    inputting image data on which an image processing job for causing execution of an image output process is to be performed;
    generating verification data based on the image data;
    generating log data to be associated with the verification data;
    storing, in at least one storage unit, the verification data and the log data to be associated with the verification data;
    determining a verification result based on whether the verification data has been stored in the at least one storage unit, wherein the verification result is positive if the verification data is stored in the at least one storage unit and the verification result is negative if the verification data is not stored in the at least one storage unit; and
    controlling the information processing apparatus to cause execution of the image output process based on the image data in response to the verification result being positive, and causing execution of the image processing job to be terminated without causing execution of the image output process in response to the verification result being negative.

8. A non-transitory computer-readable recording medium having recorded thereon a program for enabling a computer to perform the information processing method according to claim 7.

9. An information processing apparatus comprising:
    an input unit for inputting image data on which an image processing job for causing execution of an image output process is to be performed;
    a verification data generator for generating verification data based on the image data;
    a log data generator for generating log data to be associated with the verification data;
    a controller for controlling the information processing apparatus to execute the output process based on the image data in response to a result that the storing controller has stored the verification data in the at least one storage unit, and to terminate execution of the image processing job without causing execution of the image output process, in response to a result that the storing controller has not stored the verification data in the at least one storage unit; and a transmitter for transmitting the log data generated by the log data generator to an external server.

10. The information processing system according to claim 1, wherein the verifying unit verifies whether the storing controller has stored the verification data and the log data in the at least one storage unit, wherein the verification result is positive if the verification data and the log data is stored in the at least one storage unit and the verification result is negative if at least one of the verification data and the log data is not stored in the at least one storage unit.

11. The information processing method according to claim 7, wherein the verifying comprises verifying whether the verification data and the log data is stored in the at least one storage unit, wherein the verification result is positive if the verification data and the log data is stored in the at least one storage unit and the verification result is negative if at least one of the verification data and the log data is not stored in the at least one storage unit.

12. The information processing apparatus according to claim 9, wherein the verifying unit verifies whether the storing controller has stored the verification data and the log data in the at least one storage unit, wherein the verification result is positive if the verification data and the log data is stored in the at least one storage unit and the verification result is negative if at least one of the verification data and the log data is not stored in the at least one storage unit.

13. The information processing method according to claim 7, further comprising storing the image data in an image storage unit, wherein the log data includes storage location information identifying a storage location of the image data stored in the image storage unit.

14. The information processing apparatus according to claim 9, further comprising an image storing controller for storing the image data in an image storage unit, wherein the log data generated by the log data generator includes storage location information identifying a storage location of the image data stored in the image storage unit.

* * * * *